W. C. STARKEY.
TROLLEY RETRIEVER.
APPLICATION FILED NOV. 23, 1908.

969,994.

Patented Sept. 13, 1910.
3 SHEETS—SHEET 1.

Witnesses
F. R. Kane
W. H. Wittich.

Inventor
William C. Starkey
by N. C. Lord
Attorney

W. C. STARKEY.
TROLLEY RETRIEVER.
APPLICATION FILED NOV. 23, 1908.
969,994.
Patented Sept. 13, 1910.
3 SHEETS—SHEET 2.
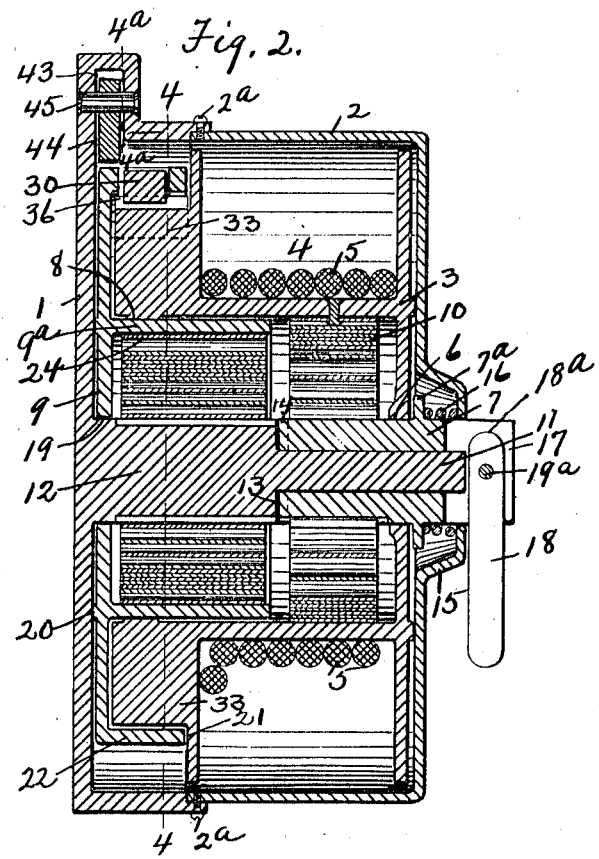
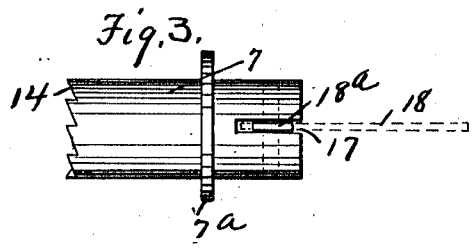
Witnesses
Inventor
William C. Starkey
Attorney

W. C. STARKEY.
TROLLEY RETRIEVER.
APPLICATION FILED NOV. 23, 1908.

969,994.

Patented Sept. 13, 1910.

3 SHEETS—SHEET 3.

Witnesses

Inventor
William C. Starkey
Attorney

UNITED STATES PATENT OFFICE.

WILLIAM CARLETON STARKEY, OF NORTH EAST, PENNSYLVANIA.

TROLLEY-RETRIEVER.

969,994.  Specification of Letters Patent.  Patented Sept. 13, 1910.

Application filed November 23, 1908. Serial No. 464,023.

*To all whom it may concern:*

Be it known that I, WILLIAM CARLETON STARKEY, a citizen of the United States, residing at North East, in the county of Erie and State of Pennsylvania, have invented new and useful Improvements in Trolley-Retrievers, of which the following is a specification.

This invention relates to trolley retrievers and consists in certain improvements in the construction thereof as will be hereinafter fully described and pointed out in the claims.

The retriever in its preferred form is intended to maintain the trolley rope taut, but yieldingly to permit the trolley to follow the variations in height of the trolley wire, and when the rope is pulled out rapidly in consequence of the trolley leaving the trolley wire it throws in automatically devices for retrieving the trolley. The mechanism also includes devices for conveniently resetting the retriever, tensioning its operating springs and other details of construction as will appear from the description.

Figure 1:
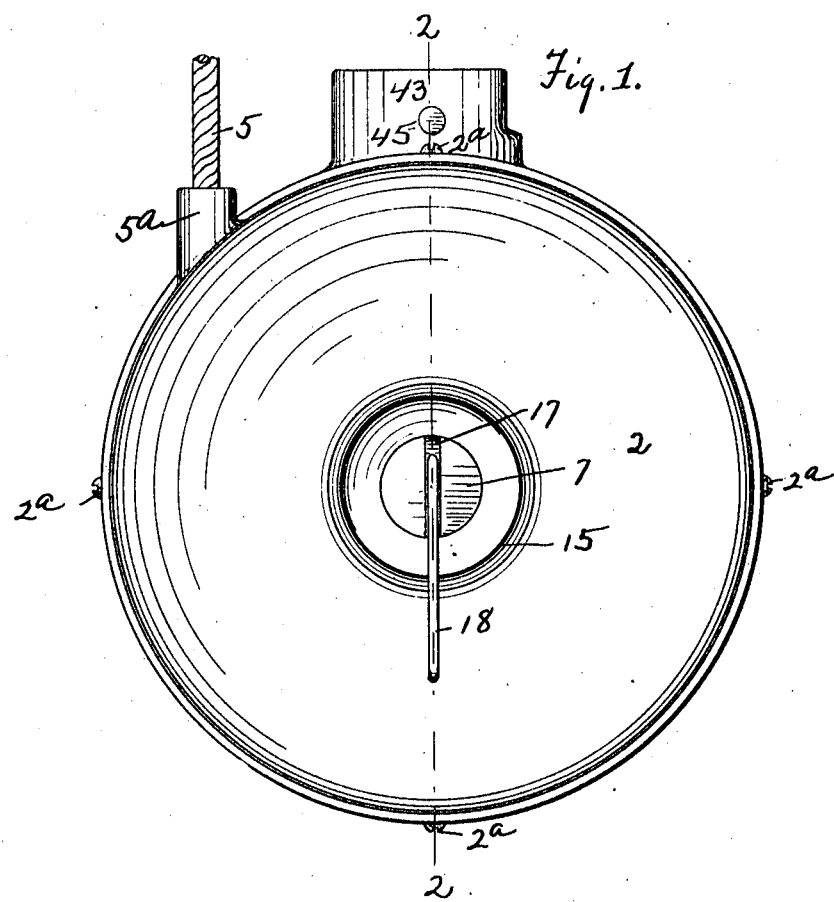
Figure 4:
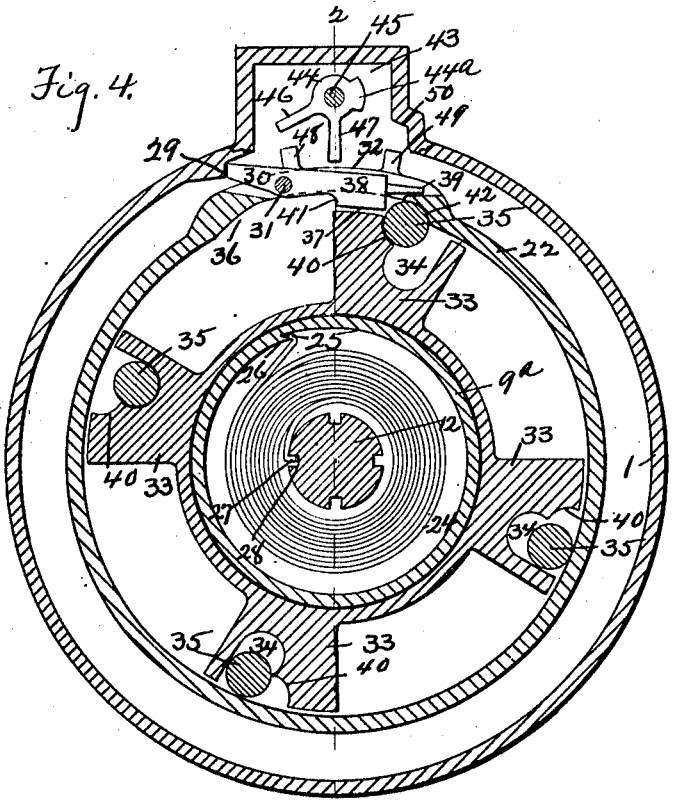
Figure 5:
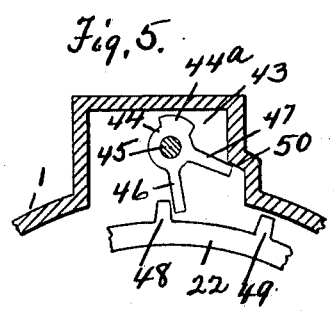
Figure 6:
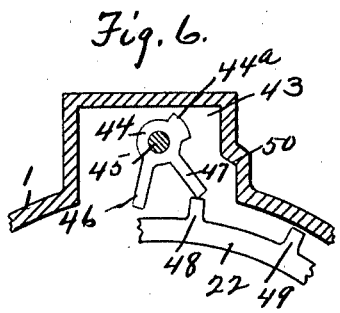

The invention is illustrated in the accompanying drawings as follows:

Figure 1 shows a side elevation of the retriever. Fig. 2 a section on the lines 2—2 in Figs. 1 and 4. Fig. 3 an elevation of the spring tensioning device. Fig. 4 a section on the line 4—4 in Fig. 2, a part at the top being broken away to a section on the line 4ª—4ª in Fig. 2. Fig. 5 is a section on the line 4ª—4ª showing one position of the resetting check pawl. Fig. 6 is a similar section showing another position of the resetting check pawl.

1 marks the base of the case and 2 the cover. The cover is removably secured to the base by screws 2ª.

The spool 3 has the spool groove 4 on which the trolley rope 5 is wound. The rope passes through an opening 5ª in the case. The spool 3 has a bearing at 6 on the spring tensioning device 7 and at 8 on the flange 9ª of the retrieving disk 9.

A rope tensioning spring 10 has one end secured to the spool and its other end secured to the tensioning device 7. This spring is so wound as to resist the unwinding of the rope from the spool and it then keeps the rope taut at all times. It is not of sufficient strength however to overcome the upward pressure to which the trolley is subjected so that the trolley is free at all times to follow the trolley wire. The tensioning device is rotatively mounted on the extension 11 on the stud 12 extending from the base 1. The shoulder formed at the base of the extension has ratchet teeth 13 which are engaged by the teeth 14 on the end of the tensioning device. A pocket 15 is formed in the face of the cover 2, and a spring 16 is placed in this pocket and is tensioned against the face of the pocket and a flange 7ª on the device 7 so as to keep the teeth 13 and 14 in engagement. A handle 18 is pivotally mounted on a pin 19ª and in the slot 17 in the end of the device 7. By means of this handle the spring 10 may give any tension desired and the ratchet teeth will hold the device to maintain this tension. By swinging the handle toward axial alinement with the device its end 18ª operating on the end of the extension 11 forces the device 7 outwardly against the tension of the spring 16 and releases the ratchet teeth so that spring 10 may unwind. By the time the ratchet teeth are disengaged the handle is near enough axial alinement to turn readily in the hand. It will be noted that in order to remove the cover 2 it is necessary to swing handle 18 to releasing position. In this way the tension on the spring 10 is always released before the cover can be removed and this lessens the danger where the device is operated by inexperienced or careless hands.

The retrieving disk 9 has a bearing at 19 on the stud 12, on the base at 20 and is adjacent at 21 to the edge of the flange 22 on the side of the spool 3.

A spring 24 is secured to the flange 9ª, the spring having a hook 25 and the flange the hook 26 and the hooks interlocking for this purpose. The other end of the spring 24 has a hook 27 which engages the edge of a notch 28 in the stud 12, thus locking this end of the spring on the stud. This spring 24 is strong enough at least in connection with spring 10 to retrieve the trolley.

A stop 29 is on the inner surface of the periphery of the base and near the top thereof. A pawl 30 is pivotally mounted in a slot 32 in the flange 22 and engages the stop 29 and thus locks the retrieving disk against the action of the spring 24.

The spool 3 has a series of arms 33 that extend under the flange 22. These arms have the pockets 34 open at their outer ends.

Locking pieces are placed in these pockets, and are free to drive in the pockets under the influence of gravity or centrifugal force. Normally the locking pieces drop to the bottoms of the pockets when the arms are at the top. The flange 22 has the outwardly extending recess 36 along its inner side so that the surface 37 of the weighted end 38 of the pawl while protruding from the surface of the recessed portion of the flange is about in the same circle as the inner surface of the flange 22 when the pawl is in engagement with the stop 29. The pawl is prevented from protruding farther through the flange by the stop 39 resting on the flange.

When the spool is rotated rapidly the locking piece 35 is thrown out by centrifugal force and through friction and inertia is forced onto a shoulder 40 at one side of the pocket. In this position it engages the cam 41 on the weighted end 38 and forces the end 38 up and the pawl 30 down out of engagement with the stop 29 thus releasing the retriever disk 9. As the disk advances it brings the shoulder 42 at the end of the recess 36 into engagement with the locking piece 35 and then forces the spool 4 to move with it to wind in the rope and thus retrieve the trolley. The rapid rotative movement given the retrieving disk exerts sufficient centrifugal force on the weighted end 38 of the pawl 30 to force it out and the pawl end in so that the pawl will clear the stop 29 as the retrieving disk revolves. All that is necessary to reset the retriever is to grasp the rope and withdraw it from the case. The spool being locked with the retriever disk, the retriever disk is rotated with the spool and the spring 24 rewound. This rewinding of course must be so slow that the speed will not make the centrifugal force greater than gravity, so that the pawl 30 will swing into place behind the stop 29 and thus lock the retriever disk.

In order that the rewinding may be automatically checked at the proper point for the pawl 30 to act, and to indicate the locking position of the retriever disk, I prefer to provide mechanism for this purpose. A pocket 43 is formed in the top of the base. A checking pawl 44 is arranged in this pocket. It is pivotally mounted on the pin 45. The pawl has two fingers 46 and 47 and is weighted at 44ᵃ to position the pawl with finger 47 extending downwardly as shown in Fig. 4. Two lugs 48 and 49 are arranged on the periphery of the disk in position to engage the fingers 46 and 47 when they are in a downward position. As the disk is rotated in rewinding the lug 49 contacts the finger 47 and swings the finger 46 in front of the lug 48. A further movement is checked by the finger 47 coming into contact with the stop 50 on the case as shown in Fig. 5. By allowing the disk to swing back slowly the finger 47 will swing between the lugs 48 and 49 and the finger 46 over the lug 48. A further rewind movement will swing the fingers clear as shown in Fig. 6. In this way the disk is checked with each revolution at the proper point for the pawl 30 to engage the stop 29. The distance between the fingers 46 and 47 is such that when the finger 47 clears the lug 49, the lug 48 is so positioned that if the flange 22 is then stopped, the finger 46 will contact the lug 48.

What I claim as new is:

1. In a trolley retriever, the combination of a case having a stop; a retriever disk having a cylindrical flange; a pawl mounted on the flange and operating on the stop; a spool; and means on the spool extending into the flange for actuating the pawl.

2. In a trolley retriever, the combination of a case having a stop; a retriever disk, having a flange; a pawl mounted on the flange and operating on the stop; a spool; and means on the spool extending into the flange for actuating the pawl when the spool is rotated rapidly, the pawl being weighted to throw the pawl out of locking position when the disk is rotated rapidly.

3. In a trolley retrieving device, the combination of a case having a stop; a retrieving disk having a flange with a peripheral recess; a pawl mounted in the flange for engaging the stop, said pawl extending through the recess; a rope spool within the flange; devices on the spool for actuating the pawl, and for locking the disk with the spool.

4. In a trolley retrieving device, the combination of a case having a stop; a retrieving disk having a flange with a peripheral recess; a pawl mounted in the flange for engaging the stop, said pawl extending into the recess; a rope spool; devices on the spool for actuating the pawl, and for engaging the end of the recess for locking the disk with the spool.

5. In a trolley retriever, the combination of a spool for the rope, said spool having locking device pockets; a retrieving device; means for locking the retrieving device normally against movement; locking pieces loose in the pockets and arranged to be thrown by centrifugal force into position to lock the retrieving device with the spool and to actuate the means to release the retrieving device the retrieving device being free to move a plurality of revolutions when released.

6. In a trolley retriever, the combination of a spool for the rope, said spool having locking device pockets; a retrieving device; locking pieces loose in the pockets and arranged to be thrown by centrifugal force into position to lock the retrieving device with the spool, means mounted on said retrieving device for locking the retrieving device normally against movement, said means moving to engaging position when the retrieving device is moved slowly and out of locking position when said retrieving device is moved rapidly.

7. In a trolley retriever, the combination of a spool for the rope, said spool having locking device pockets; a retrieving device; means for locking the retrieving device normally against movement, said means moving to engaging position when the retrieving device is moved slowly and out of locking position when said retrieving device is moved rapidly; and locking pieces loose in the pockets and arranged to be thrown by centrifugal force into position to lock the retrieving device with the spool.

8. In a trolley retriever, the combination of a spool, said spool having locking device pockets 34 therein with the shoulders 40 arranged at the sides of the pockets; a retrieving device having a shoulder 42 opposed to the shoulder 40; locking pieces 35 loosely arranged in the pockets adapted to be thrown out by centrifugal force into locking position, and to move by gravity out of locking position; the pawl 30 for locking the retrieving device, said pawl having a weighted end 38 for holding it normally in locking position with the retrieving device stationary, and for holding the pawl out of position with the retrieving device moving rapidly, said weighted end having the cam 41 in the path of the locking piece 35 when the locking piece is in locking position.

9. In a trolley retriever, the combination of a spool, said spool having locking device pockets 34 therein with the shoulders 40 arranged at the sides of the pockets; a retrieving device having a shoulder 42 opposed to the shoulder 40; locking pieces 35 loosely arranged in the pockets adapted to be thrown out by centrifugal force into locking position, and to move by gravity out of locking position; the pawl 30 for locking the retrieving device, said pawl having a weighted end 38 for holding it normally in locking position with the retrieving device stationary, and for holding the pawl out of position with the retrieving device moving rapidly, said weighted end having the cam 41 spaced ahead of the shoulder 42, so that the pawl 30 is thrown out of locking position prior to the engagement of the shoulder 42 with the locking pieces.

10. In a trolley retriever, the combination of a case having the stud 12 with the extension 11 thereon; a spool having a bearing surface 6 and a second bearing surface 8; a retrieving device having a flange on which the bearing surface 8 rests; and springs for operating the retrieving device and the spool.

11. In a trolley retriever, the combination of a spool; a retrieving device; springs for actuating the retrieving device; a spring for operating the spool; a case in which said retrieving device and spool are mounted; a ratchet device comprising a stationary part and a co-acting movable part to which the spring operating the spool is attached, the ratchet device being arranged to move axially; and a spring for holding the ratchet device in engagement.

12. In a trolley retriever, the combination of a spool; a retrieving device; a spring for actuating the retrieving device; a spring for operating the spool; a case in which said retrieving device and spool are mounted; a ratchet device for locking the spool spring under tension and means outside the case for releasing the ratchet device.

13. In a trolley retriever, the combination of a case having a removable cover; a retrieving device arranged in the case; a spool arranged in the case; a spring for actuating the retrieving device; a spring for actuating the spool; a ratchet device for tensioning the spool spring from without the case and for releasing the tension on the spool spring, said device comprising mechanism compelling the release of the tension on the spring prior to the removal of the cover.

14. In a trolley retriever, the combination of a spool; a case in which the spool is mounted; said case being provided with removable cover a spring for actuating the spool; means for tensioning the spring from without the case and for releasing the tension on the spring, said device comprising mechanism compelling the releasing of the tension on the spring prior to the removal of the cover.

15. In a trolley retriever, the combination of a case having a removable cover; a spool in the case; a spring for actuating the spool; a ratchet mechanism for tensioning the spring, said mechanism moving into and out of locking position by movement in an axial direction; a handle for actuating the ratchet mechanism from outside the case, said handle being pivotally mounted on the mechanism and arranged to throw the ratchet out of engagement, said case and handle being arranged to require the swinging of the handle to release the ratchet mechanism to permit the removal of the cover.

16. In a trolley retrieving device the combination of a case; a retrieving device mounted in the case; a lock for locking the retrieving device normally stationary; a spool on which the trolley rope may be wound; means for locking the spool with the retrieving device; and an indicator adapted to indicate through the sense of touch when the locking device is in locking position.

17. In a trolley retriever, the combination of a case; a retrieving device mounted in the case; a locking device for the retrieving device adapted to lock the retrieving device when stationary, and to be thrown out of locking position when the retrieving device is moved rapidly; a trolley spool; means for locking the spool with the retrieving device; and an indicator adapted to indicate through the sense of touch when the locking device is in locking position.

18. In a trolley retriever, the combination of a case; a retrieving device mounted in the case; a locking device for the retrieving device adapted to lock the retrieving device when stationary, and to be drawn out of locking position when the retrieving device is moved rapidly; a trolley spool; means for locking the spool with the retrieving device; and an indicator comprising mechanism checking the movement of the retriever, and requiring a return movement of the retriever prior to a second advance past the locking position.

19. In a trolley retriever, the combination of a case; a retrieving device mounted in the case, and having two lugs thereon; a double pawl swingingly mounted in the case, the fingers of said pawls being spaced with reference to the distances between the two lugs on the retrieving device, and weighted so that the leading lug on the retrieving device first engages one of the fingers of the double pawl and swings the second of said fingers in front of the second lug; and a stop which the first of said fingers engages as the second of said fingers is engaged by the second of said lugs, the distance between the lugs bringing the second of said fingers into engagement with the second of said lugs as the first of said fingers clears the first of said lugs.

In testimony whereof I hereunto set my hand in the presence of two subscribing witnesses.

WILLIAM CARLETON STARKEY.

Witnesses:
CLYDE C. HILL,
R. O. BRONSON.